US007680654B2

(12) United States Patent
Goronzy et al.

(10) Patent No.: US 7,680,654 B2
(45) Date of Patent: Mar. 16, 2010

(54) APPARATUS AND METHOD FOR SEGMENTATION OF AUDIO DATA INTO META PATTERNS

(75) Inventors: Silke Goronzy, Fellbach-Schmiden (DE); Thomas Kemp, Esslingen (DE); Ralf Kompe, Röttenbach (DE); Yin Hay Lam, Stuttgart (DE); Krzysztof Marasek, Warsaw (PL); Raquel Tato, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 1281 days.

(21) Appl. No.: 10/985,615

(22) Filed: Nov. 10, 2004

(65) Prior Publication Data

US 2005/0114388 A1 May 26, 2005

(30) Foreign Application Priority Data

Nov. 12, 2003 (EP) .................................. 03026048

(51) Int. Cl.
*G10L 15/00* (2006.01)
*G10L 15/20* (2006.01)

(52) U.S. Cl. ....................................... 704/231; 704/233

(58) Field of Classification Search ................. 704/231, 704/233

See application file for complete search history.

(56) References Cited

U.S. PATENT DOCUMENTS 6,185,527 B1 2/2001 Petkovic et al.

OTHER PUBLICATIONS

Zhang et al, "Audio-Guided Audiovisual Data Segmentation, Indexing, and Retrieval", IS&T/SPIE Conference on Storage and Retrieval for Image and Video Databases, Jan. 1999.*

Li et al, "Classification of General Audio Data for Content-Based Retrieval", Pattern Recognition Letters, 2001.*

Messer et al, "Automatic Sports Classification", 16th International Conference on Pattern Recognition Proceedings, Dec. 2002.*

Zhu Liu et al: "Audio Feature Extraction and Analysis for Scene Segmentation and Classification" Journal of VLSI Signal Processing Systems for Signal, Image, and Video Technology, Kluwer Academic Publishers, Dordrecht, NL, vol. 20, No. 1/2, Oct. 1, 1998, pp. 61-78, XP000786728.

(Continued)

*Primary Examiner*—David R Hudspeth
*Assistant Examiner*—Samuel G Neway
(74) *Attorney, Agent, or Firm*—Oblon, Spivak, McClelland, Maier & Neustadt, L.L.P.

(57) ABSTRACT

An audio data segmentation apparatus for segmenting of audio data including for supplying audio data, dividing the audio data supplied into audio clips of a predetermined length, discriminating the audio clips into predetermined audio classes, the audio classes identifying a kind of audio data included in the respective audio clip and segmenting for segmenting the audio data into audio meta patterns based on a sequence of audio classes of consecutive audio clips, each meta pattern being allocated to a predetermined type of contents of the audio data. It is difficult to achieve good results with known methods for segmentation of audio data into meta patterns since the rules for the allocation of the meta patterns are dissatisfying. This problem is solved by the inventive audio data segmentation apparatus further including a program database including program data units to identify a certain kind of program, a plurality of respective audio meta patterns being allocated to each program data unit, wherein the segmenting segments the audio data into corresponding audio meta patterns on the basis of the program data units of the program database 5.

32 Claims, 2 Drawing Sheets

OTHER PUBLICATIONS

Lefevre S et al: "3 Classes Segmentation for Analysis of Football Audio Sequences" 14th International Conference on Digital Signal Processing Proceedings. DSP 2002, vol. 2, Jul. 1, 2002—Jul. 3, 2002, pp. 975-978, XP0010600015.

Tzanetakis G. et al., "Marsyas: A framework for audio analysis, Department of Computer Science and Department of Music", Princeton University, Princeton, New Jersey, pp. 1-13.

Kimber, D. et al., "Acoustic Segmentation for Audio Browsers", Xerox PARC and FX Palo Alto Laboratory, Palo Alto, California. 10 pages.

Harb, H. et al., "Speech/Music/Silence and Gender Dectection Algorithm", Lab. ICTT Dept. Mathmatics - Informatique, Cedex, France 6 pages.

Lawrence R. Rabiner, "A Tutorial on Hidden Markov Models and Selected Applications in Speech Recognition", Proceedings of the IEEE, Vol. 77, No. 2, Feb., 1989, pp. 257-286.

* cited by examiner

APPARATUS AND METHOD FOR SEGMENTATION OF AUDIO DATA INTO META PATTERNS

The present invention relates to an audio data segmentation apparatus and method for segmenting audio data comprising the features of the preambles of independent claims 1, 21 and 36, respectively.

There is a growing amount of video data available on the Internet and in a variety of storage media e.g. digital video discs. Furthermore, said video data is provided by a huge number of telestations as an analog or digital video signal.

The video data is a rich multilateral information source containing speech, audio, text, colour patterns and shape of imaged objects and motion of these objects.

Currently, there is a desire for the possibility to search for segments of interest (e.g. certain topics, persons, events or plots etc.) in said video data.

In principle, any video data can be primarily classified with respect to its general subject matter.

Said general subject matter might be for example news or sports if the video data is a tv-programme.

In the present patent application, said general subject matter of the video data is referred to as "programme".

Usually each programme contains a plurality of self-contained activities.

If the programme is news for example, the self-contained activities might be the different notices mentioned in the news. If the programme is football, for example, said self-contained activities might be kick-off, penalty kick, throw-in etc.

In the following, said self-contained activities which are included in a programme are called "contents".

Thus, the video data belonging to a certain programme can be further classified with respect to its contents.

The traditional video tape recorder sample playback mode for browsing and skimming analog video data is cumbersome and inflexible. The reason for this problem is that the video data is treated as a linear block of samples. No searching functionality is provided.

To address this problem some modern video tape recorder comprise the possibility to set indexes either manually or automatically each time a recording operation is started to allow automatic recognition of certain sequences of video data. It is a disadvantage with said indexes that the indexes can not individually identify a certain sequence of video data. Furthermore, said indexes can not identify a certain sequence of video data individually for each user.

On the other hand, digital video discs comprise digitised video data, wherein chapters are added to the video data during the production of the digital video disc. Said chapters normally allow identification of the story line, only.

An obvious solution to the problem of handling large amounts of video data would be to manually divide the video data into segments according to its contents and to provide a detailed segment information.

Due to the immense amount of video sequences comprised in the available video data, manual segmentation is extremely time-consuming and thus expensive. Therefore, this approach is not practicable to process a huge amount of video data.

To solve the above problem approaches for automatic indexing of video data have been recently proposed.

Possible application areas for such an automatic indexing of video data are digital video libraries or the Internet, for example.

Since video data is composed of at least a visual channel and one or several audio channels an automatic video segmentation process could either rely on an analysis of the visual channel or the audio channels or on both.

In the following, a segmentation process which is focused on analysis of the audio channel of video data is further discussed. It is evident that this approach is not limited to the audio channel of video data but might be used for any kind of audio data except physical noise. Furthermore, the general considerations can be applied to other types of data, e.g. analysis of the video channel of video data, too.

The known approaches for the segmentation process comprise clipping, automatic classification and automatic segmentation of the audio data contained in the audio channel of video data.

Clipping is performed to divide the audio data (and corresponding video data) into audio pieces of a predetermined length for further processing. The accuracy of the segmentation process thus is depending on the length of said audio pieces.

Classification stands for a raw discrimination of the audio data with respect to the origin of the audio data (e.g. speech, music, noise, silence and gender of speaker) which is usually performed by signal analysis techniques.

Segmentation stands for segmenting of the (video) data into individual audio meta patterns of cohesive audio pieces. Each audio meta pattern comprises all the audio pieces which belong to a content or an event comprised in the video data (e.g. a goal, a penalty kick of a football match or different news during a news magazine).

A stochastic signal model frequently used with classification of audio data is the HIDDEN MARKOV MODEL which is explained in detail in the essay "A Tutorial on Hidden Markov Models and Selected Applications in Speech Recognition" by Lawrence R. RABINER published in the Proceedings of the IEEE, Vol. 77, No. 2, February 1989.

Different approaches for audio-classification-segmentation with respect to speech, music, silence and gender are disclosed in the paper "Speech/Music/Silence and Gender Detection Algorithm" of Hadi HARB, Liming CHEN and Jean-yves AULOGE published by the Lab. ICTT Dept. Mathematiques—Informatiques, ECOLE CENTRALE DE LYON. 36, avenue Guy de Collongue B.P. 163, 69131 ECULLY Cedex, France.

In general, the above paper is directed to discrimination of an audio channel into speech/music/silence/and noise which helps improving scene segmentation. Four approaches for audio class discrimination are proposed: A model-based approach where models for each audio class are created, the models being based on low level features of the audio data such as cepstrum and MFCC. The metric-based segmentation approach uses distances between neighbouring windows for segmentation. The rule-based approach comprises creation of individual rules for each class wherein the rules are based on high and low level features. Finally, the decoder-based approach uses the hidden Makrov model of a speech recognition system wherein the hidden Makrov model is trained to give the class of an audio signal.

Furthermore, this paper describes in detail speech, music and silence properties to allow generation of rules describing each class according to the rule based approach as well as gender detection to detect the gender of a speech signal.

"Audio Feature Extraction and Analysis for Scene Segmentation and Classification" is disclosed by Zhu LIU and Yao WANG of the Polytechnic University Brooklyn, USA together with Tsuhan CHEN of the Carnegie Mellon University, Pittsburg, USA. This paper describes the use of associated audio information for video scene analysis of video data to discriminate five types of TV programs, namely commercials, basketball games, football games, news report and weather forecast.

According to this paper the audio data is divided into a plurality of clips, each clip comprising a plurality of frames.

A set of low level audio features comprising analysis of volume contour, pitch contour and frequency domain features as bandwidth are proposed for classification of the audio data contained in each clip.

Using a clustering analysis, the linear separability of different classes is examined to separate the video sequence into the above five types of TV programs.

Three layers of audio understanding are discriminated in this paper: In a low-level acoustic characteristics layer low level generic features such as loudness, pitch period and bandwidth of an audio signal are analysed. In an intermediate-level acoustic signature layer the object that produces a particular sound is determined by comparing the respective acoustic signal with signatures stored in a database. In a high level semantic-model some a prior known semantic rules about the structure of audio in different scene types (e.g. only speech in news reports and weather forecasts, but speech with noisy background in commercials) are used.

To segment the audio data into audio meta patterns sequences of audio classes of consecutive audio clips are used.

To further enhance accuracy of this prior art method, it is proposed to combine the analysis of the audio data of video data with an analysis of the visual information comprised in the video data (e.g. the respective colour patterns and shape of imaged objects).

The U.S. Pat. No. 6,185,527 discloses a system and method for indexing an audio stream for subsequent information retrieval and for skimming, gisting, and summarising the audio stream. The system and method includes use of special audio prefiltering such that only relevant speech segments that are generated by a speech recognition engine are indexed. Specific indexing features are disclosed that improve the precision and recall of an information retrieval system used after indexing for word spotting. The invention includes rendering the audio stream into intervals, with each interval including one or more segments. For each segment of an interval it is determined whether the segment exhibits one or more predetermined audio features such as a particular range of zero crossing rates, a particular range of energy, and a particular range of spectral energy concentration. The audio features are heuristically determined to represent respective audio events, including silence, music, speech, and speech on music. Also, it is determined whether a group of intervals matches a heuristically predefined meta pattern such as continuous uninterrupted speech, concluding ideas, hesitations and emphasis in speech, and so on, and the audio stream is then indexed based on the interval classification and meta pattern matching, with only relevant features being indexed to improve subsequent precision of information retrieval. Also, alternatives for longer terms generated by the speech recognition engine are indexed along with respective weights, to improve subsequent recall.

Thus, it is inter alia proposed to automatically provide a summary of an audio stream or to gain an understanding of the gist of an audio stream.

Algorithms which generate indices from automatic acoustic segmentation are described in the essay "Acoustic Segmentation for Audio Browsers" by Don KIMBER and Lynn WILCOX. These algorithms use hidden Markov models to segment audio into segments corresponding to different speakers or acoustic classes. Types of proposed acoustic classes include speech, silence, laughter, non-speech sounds and garbage, wherein garbage is defined as non-speech sound not explicitly modelled by the other class models.

An implementation of the known methods is proposed by George TZANETAKIS and Perry COOK in the essay "MARSYAS: A framework for audio analysis" wherein a client-server architecture is used.

When segmenting audio data into audio meta patterns it is a crucial problem that a certain sequence of audio classes of consecutive segments of audio data usually can be allocated to a variety of audio meta patterns.

For example, the consecutive sequence of audio classes of consecutive segments of audio data for a goal during a football match might be speech-silence-noise-speech and the consecutive sequence of audio classes of consecutive segments of audio data for a presentation of a video clip during a news magazine might be speech-silence-noise-speech, too. Thus, in the present example no unequivocal allocation of a corresponding audio meta pattern can be performed.

To solve the above problem, known meta pattern segmentation algorithms usually employ a rule based approach for the allocation of meta patterns to a certain sequence of audio classes.

Therefore, various rules are required for the allocation of the audio meta patterns to address the problem that a certain sequence of audio classes of consecutive segments of audio data can be allocated to a variety of audio meta patterns. The determination process to find an acceptable rule for each meta pattern usually is very difficult, time consuming and subjective since it is dependent on both the used raw audio data and the personal experience of the person conducting the determination process.

In consequence it is difficult to achieve good results with known methods for segmentation of audio data into audio meta patterns since the rules for the allocation of the audio meta patterns are dissatisfying.

It is the object of the present invention to overcome the above cited disadvantages and to provide a system and method for segmentation of audio data into meta patterns which uses an easy and reliable way for the allocation of meta patterns to respective sequences of audio classes.

The above object is solved in an audio data segmentation apparatus comprising the features of the preamble of independent claim 1 by the features of the characterising part of claim 1.

Furthermore, the above object is solved with a method for audio data segmentation comprising the features of the preamble of independent claim 21 by the features of the characterising part of claim 21.

Further developments are set forth in the dependent claims.

According to the present invention an audio data segmentation apparatus for segmenting audio data comprises audio data input means for supplying audio data, audio data clipping means for dividing the audio data supplied by the audio data input means into audio clips of a predetermined length, class discrimination means for discriminating the audio clips supplied by the audio data clipping means into predetermined audio classes, the audio classes identifying a kind of audio data included in the respective audio clip, segmenting means for segmenting the audio data into audio meta patterns based on a sequence of audio classes of consecutive audio clips, each meta pattern being allocated to a predetermined type of contents of the audio data and a programme database comprising programme data units to identify a certain kind of programme, a plurality of respective audio meta patterns being allocated to each programme data unit, wherein the segmenting means segments the audio data into corresponding audio meta patterns on the basis of the programme data units of the programme database.

Thus, according to the present invention a plurality of programme data units are stored in the programme database. Each programme data unit comprises a number of audio meta patterns which are suitable for a certain programme.

In the present document a programme indicates the general subject matter included in the audio data which are not yet divided into audio clips by the audio data clipping means. Self-contained activities comprised in each the audio data of each programme are called contents.

The present invention bases on the fact that different programmes usually comprise different contents, too.

Thus, by using the respective programme data unit in dependency on the programme the audio data actually belongs to, it is possible to define a number of audio meta patterns which are most probably suitable for segmentation of the respective audio data. Therefore, allocation of meta patterns to respective sequences of audio classes is significantly facilitated.

According to the present invention, the audio classes identify a kind of audio data. Thus, the audio classes are adapted/optimised/trained to identify a kind of audio data.

Advantageously the audio data segmentation apparatus further comprises an audio class probability database comprising probability values for each audio class with respect to a certain number of preceding audio classes for a sequence of consecutive audio clips, wherein the segmenting means uses both the programme database and the audio class probability database for segmenting the audio data into corresponding audio meta patterns.

By using probability values for each audio class which are stored in the audio class probability database it is possible to identify the significance of each audio class with respect to a certain number of preceding audio classes and to account for said significance during segmentation of audio data into audio meta patterns.

Furthermore, it is beneficial if the audio data segmentation apparatus additionally comprises an audio meta pattern probability database comprising probability values for each audio meta pattern with respect to a certain number of preceding audio meta patterns for a sequence of audio classes, wherein the segmenting means uses as well the programme database as the audio class probability database as the audio meta pattern probability database for segmenting the audio data into corresponding audio meta patterns.

As said before, plural audio meta patterns might be characterised by the same sequence of audio classes of consecutive audio clips. In case said audio meta patterns belong to the same programme data unit no unequivocal decision can be made by the segmenting means based on the programme database, only.

By using probability values for each audio meta pattern which are stored in the audio meta pattern probability database it is possible to identify a certain audio meta pattern out of the plurality of audio meta patterns which most probably is suitable to identify the type of contents of the audio data with respect to the preceding audio meta patterns.

Thus, no further rules have to be provided to deal with problems where more then one audio meta pattern of a programme data unit is characterised by the same sequence of audio classes of consecutive audio clips.

According to a preferred embodiment of the present invention the segmenting means segments the audio data into audio meta patterns by calculating probability values for each audio meta data for each sequence of audio classes of consecutive audio clips based on the programme database and/or the audio class probability database and/or the audio meta pattern probability database.

By taking the joint maximum probability of all knowledge sources provided by the audio data without making any earlier decision, it is possible to ensure optimality in segmentation of audio data into audio meta patterns since errors in one of either the class discrimination means or the segmenting means or anyone of the databases do not necessarily lead to an error of the final segmentation. Thus, the apparatus according to the present invention exploits the statistical characteristics of the respective audio data to enhance its accuracy.

Favourably, the audio data segmentation apparatus further comprises a programme detection means to identify the kind of programme the audio data belongs to by using the previously segmented audio data, wherein the segmenting means is further limits segmentation of the audio data into audio meta patterns to the audio meta patterns allocated to the programme data unit of the kind of programme identified by the programme detection means.

By the provision of a programme detection means it is possible to significantly reduce the number of potential audio meta patterns which have to be examined by the segmenting means and thus to enhance both accuracy and velocity of the inventive audio data segmentation apparatus.

It is profitable if the class discrimination means further calculates a class probability value for each audio class of each audio clip, wherein the segmenting means is uses the class probability values calculated by the class discrimination means for segmenting the audio data into corresponding audio meta patterns.

Thus, even the accuracy of the class discrimination means can be considered by the segmenting means when segmenting the audio data into audio meta patterns.

Segmentation of the audio data into audio meta patterns can be performed in an very easy way by the segmenting means using a Viterbi algorithm.

Preferential, the class discrimination means uses a set of predetermined audio class models which are provided for each audio class for discriminating the audio clips into predetermined audio classes.

Thus, the class discrimination means can use well-engineered class models for discriminating the clips into predetermined audio classes.

Said predetermined audio class models can be generated by empiric analysis of manually classified audio data.

According to a preferred embodiment, the audio class models are provided as hidden Markov models.

Advantageously, the class discrimination means analyses acoustic characteristics of the audio data comprised in the audio clips to discriminate the audio clips into the respective audio classes.

Said acoustic characteristics preferably comprise energy/loudness, pitch period, bandwidth and mfcc of the respective audio data. Further characteristics might be used.

Favourably, the audio data input means are further adapted to digitise the audio data. Thus, even analog audio data can be processed by the inventive audio data segmentation apparatus.

According to an embodiment of the present invention, each audio clip generated by the audio data clipping means contains a plurality of overlapping short intervals of audio data.

To allow an acceptable segmentation of the audio data into meta patterns it is beneficial if the predetermined audio classes comprise at least a class for each silence, speech, music, cheering and clapping.

According to an embodiment of the present invention, the programme database comprises programme data units for at least each sports, news, commercial, movie and reportage.

Favourably, probability values for each audio class and/or each audio meta pattern are generated by empiric analysis of manually classified audio data.

Furthermore, it is profitable if the audio data segmentation apparatus further comprises an output file generation means to generate an output file, wherein the output file contains the begin time, the end time and the contents of the audio data allocated to a respective meta pattern.

Such an output file can be handled by search engines and data processing means with ease.

It is preferred that the audio data is part of raw data containing both audio data and video data. Alternatively, raw data containing only audio data might be used.

Furthermore, the above object is solved by a method for segmenting audio data comprising the following steps:

- dividing audio data into audio clips of a predetermined length;
- discriminating the audio clips into predetermined audio classes, the audio classes identifying a kind of audio data included in the respective audio clip; and
- segmenting the audio data into audio meta patterns based on a sequence of audio classes of consecutive audio clips, each audio meta pattern being allocated to a predetermined type of contents of the audio data;

wherein the step of segmenting the audio data into audio meta patterns further comprises the use of a programme database comprising programme data units to identify a certain kind of programme, wherein a plurality of respective audio meta patterns is allocated to each programme data unit and the segmenting is performed on the basis of the programme data units.

Preferably the step of segmenting the audio data into audio meta patterns further comprises the use of an audio class probability database comprising probability values for each audio class with respect to a certain number of preceding audio classes for a sequence of consecutive audio clips for segmenting the audio data into corresponding audio meta patterns.

Advantageously the step of segmenting the audio data into audio meta patterns further comprises the use of an audio meta pattern probability database comprising probability values for each audio meta pattern with respect to a certain number of preceding audio meta patterns for segmenting the audio data into corresponding audio meta patterns.

According to a preferred embodiment the step of segmenting the audio data into audio meta patterns comprises calculation of probability values for each meta data for each sequence of audio classes of consecutive audio clips based on the programme database and/or the audio class probability database and/or the audio meta pattern probability database.

Moreover, the method for segmenting audio data can further comprise the step of identifying the kind of programme the audio data belongs to by using the previously segmented audio data, wherein the step of segmenting the audio data into audio meta patterns comprises limiting segmentation of the audio data into audio meta patterns to the audio meta patterns allocated to the programme data unit of the identified programme.

It is profitable if the step of discriminating the audio clips into predetermined audio classes comprises calculation of a class probability value for each audio class of each audio clip, wherein the step of segmenting the audio data into audio meta patterns further comprises the use of the class probability values calculated by the class discrimination means for segmenting the audio data into corresponding audio meta patterns.

According to an embodiment of the present invention the step of segmenting the audio data into audio meta patterns comprises the use of a Viterbi algorithm to segment the audio data into audio meta patterns.

It is preferred that the step of discriminating the audio clips into predetermined audio classes comprises the use of a set of predetermined audio class models which are provided for each audio class for discriminating the clips into predetermined audio classes.

Advantageously, the method for segmenting audio data further comprises the step of generating the predetermined audio class models by empiric analysis of manually classified audio data.

It is beneficial if hidden Markov models are used to represent the audio classes.

Favourably, the step of discriminating the audio clips into predetermined audio classes comprises analysis of acoustic characteristics of the audio data comprised in the audio clips.

Profitably, the acoustic characteristics comprise energy/loudness, pitch period, bandwidth and mfcc of the respective audio data. Further acoustic characteristics might be used.

It is preferred that the method for segmenting audio data further comprises the step of digitising audio data.

Advantageously, the method for segmenting audio data further comprises the step of empiric analysis of manually classified audio data to generate probability values for each audio class and/or for each audio meta pattern.

Moreover, it is preferred if the method for segmenting audio data further comprises the step of generating an output file, wherein the output file contains the begin time, the end time and the contents of the audio data allocated to a respective meta pattern.

The above object is additionally solved in an audio data segmentation apparatus comprising the features of the preamble of independent claim 36 by the features of the characterising part of claim 36. Further developments are set forth in the dependent claims 37 and 38.

According to a further embodiment of the present invention, the audio data segmentation apparatus for segmenting audio data comprises audio data input means for supplying audio data, audio data clipping means for dividing the audio data supplied by the audio data input means into audio clips of a predetermined length, class discrimination means for discriminating the audio clips supplied by the audio data clipping means into predetermined audio classes, the audio classes identifying a kind of audio data included in the respective audio clip, segmenting means for segmenting the audio data into audio meta patterns based on a sequence of audio classes of consecutive audio clips, each meta pattern being allocated to a predetermined type of contents of the audio data, wherein a plurality of audio meta patterns is stored in the segmenting means, and a probability database comprising probability values, wherein the segmenting means segments the audio data into corresponding audio meta patterns on the basis of the probability values stored in the probability database.

By the provision of a probability database the number of rules which are necessary to allocate a certain audio meta pattern to a certain sequence of audio classes of consecutive audio clips can be significantly reduced.

Preferably, the probability database comprises probability values for each audio class with respect to a certain number of preceding audio classes for a sequence of consecutive audio clips, wherein the segmenting means segments the audio data into corresponding audio meta patterns on the basis of the probability values for each audio class stored in the probability database.

By using probability values for each audio class which are stored in the audio class probability database it is possible to identify the significance of each audio class with respect to a certain number of preceding audio classes and to account for said significance during segmentation of audio data into audio meta patterns Furthermore, it is beneficial if the probability database comprises probability values for each audio meta pattern with respect to a certain number of preceding audio meta patterns for a sequence of audio classes, wherein the segmenting means segments the audio data into corresponding audio meta patterns on the basis of the probability values for each audio meta pattern stored in the probability database.

As said before, plural audio meta patterns might be characterised by the same sequence of audio classes of consecutive audio clips.

By using probability values for each audio meta pattern which are stored in the audio meta pattern probability database it is possible to identify a certain audio meta pattern out of a plurality of audio meta patterns which most probably is suitable to identify the type of contents of the audio data with respect to the preceding audio meta patterns.

Thus, no further rules have to be provided to deal with problems where more then one audio meta pattern is characterised by the same sequence of audio classes of consecutive audio clips.

In the following detailed description, the present invention is explained by reference to the accompanying drawings, in which like reference characters refer to like parts throughout the views, wherein:

FIG. 1 shows an audio data segmentation apparatus according to the present invention.

Figure 1:
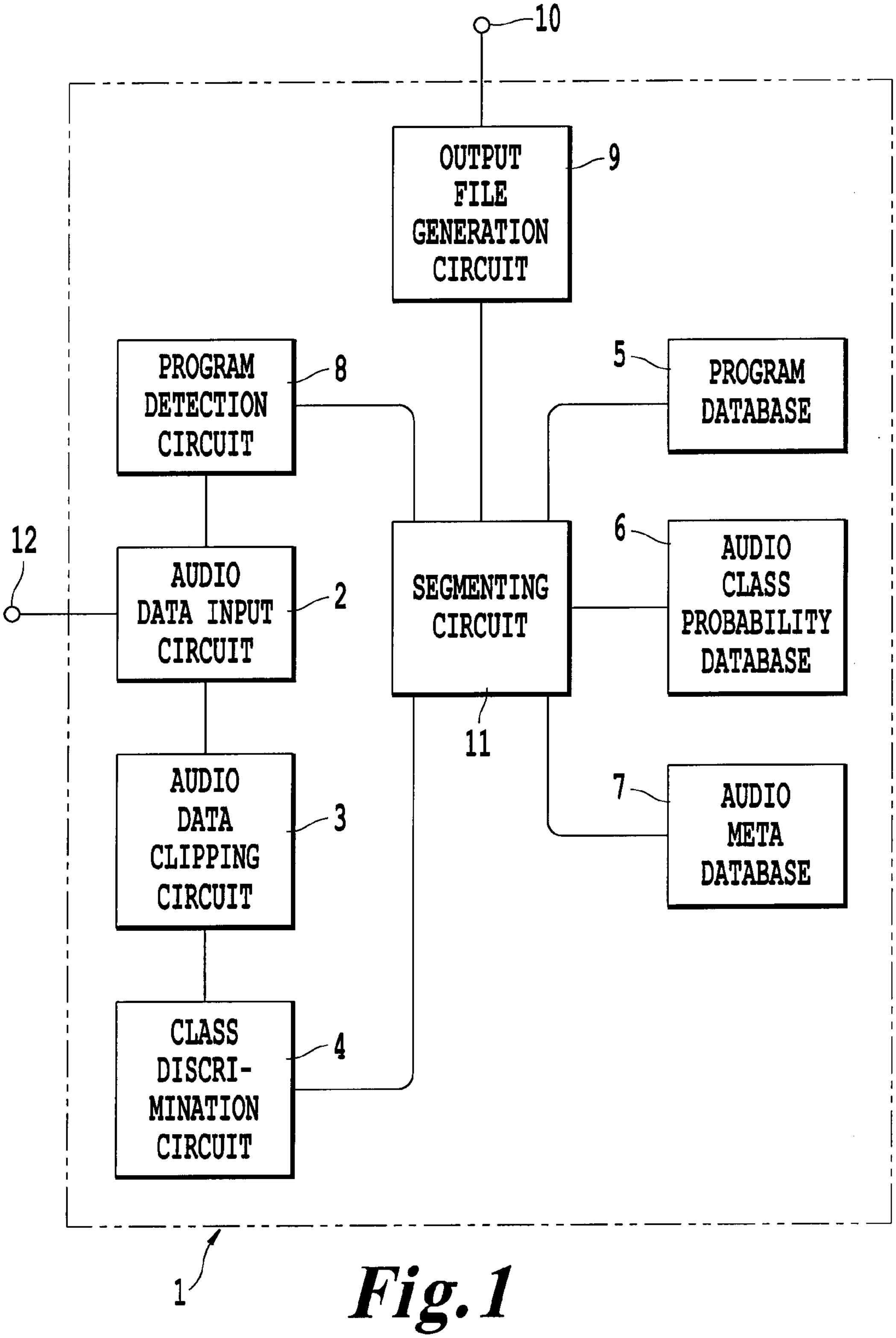
FIG. 1 shows a block diagram of an audio data segmentation apparatus according to the present invention.

In the one embodiment, the audio data segmentation apparatus 1 is included into a digital video recorder which is not shown in the figures. Alternatively, the data segmentation apparatus might be included in a different digital audio/video apparatus, such as a personal computer or workstation or might be provided as a separate equipment.

The audio data segmentation apparatus 1 for segmenting audio data comprises audio data input means 2 for supplying audio data via an audio data entry port 12.

The audio data input means 2 digitises analogue audio data provided to the data entry port 12.

In the present example the analogue audio data is part of an audio channel of a conventional television channel. Thus, the audio data is part of real time raw data containing both audio data and video data.

Alternatively, raw data containing only audio data might be used.

Instead, if digital audio data is provided to the audio data input means 2 no further digitising is performed but the data is passed through the audio data input means 2, only. Said digital audio data might be the audio channel of a digital video disc, for example.

The audio data supplied by the audio data input means 2 is transmitted to audio data clipping means 3 which are adapted to divide/for dividing the audio data into audio clips of a predetermined length.

According to the present example each audio clip comprises one second of audio data. Alternatively, any other suitable length (e.g. number of seconds or fraction of seconds) may be chosen.

Furthermore, the audio data comprised in each clip is further divided into a plurality of frames of 512 samples, wherein consecutive frames are shifted by 180 samples with respect to the respective antecedent frame. This subdivision of the audio data comprised in each clip allows an precise and easy handling of the audio clips.

It is evident for a man skilled in the art that alternatively subdivisions of the audio data into a plurality of frames comprising more or less than 512 samples is possible. Furthermore, consecutive frames might be shifted by more or less than 180 samples with respect to the respective antecedent frame.

Thus, each audio clip generated by the audio data clipping means 3 contains a plurality of overlapping short intervals of audio data called frames.

The audio clips supplied by the audio data clipping means 3 are further transmitted to class discrimination means 4.

The class discrimination means 4 (are adapted to) discriminate the audio clips into predetermined audio classes, whereby each audio class identifies the kind of audio data included in the respective audio clip. Thus, the audio classes are adapted/optimised/trained to identify a kind of audio data included in the respective audio clip.

According to the present embodiment an audio class for each silence, speech, music, cheering and clapping is provided. Alternatively, further audio classes e.g. noise or male/female speech might be determined.

The discrimination of the audio clips into audio classes is performed by the class discrimination means 4 by using a set of predetermined audio class models generated by empiric analysis of manually classified audio data. Said audio class models are provided for each predetermined audio class in the form of hidden Markov models and are stored in the class discrimination means 4.

The audio clips supplied to the class discrimination means 4 by the audio data clipping means 3 are analysed with respect to acoustic characteristics of the audio data comprised in the audio clips, e.g. energy/loudness, pitch period, bandwidth and mfcc (Mel frequency cepstral coefficients) of the respective audio data to discriminate the audio clips into the respective audio classes by use of said audio class models.

Furthermore, when discriminating the audio clips into the predetermined audio classes the class discrimination means 4 additionally calculates a class probability value for each audio class.

Said class probability value indicates the likeliness whether the correct audio class has been chosen for a respective audio clip.

In the present example said probability value is generated by counting how many characteristics of the respective audio class model are fully met by the respective audio clip.

It is obvious for a skilled person that the class probability value alternatively might be generated/calculated automatically in a way different from counting how many characteristics of the respective audio class model are fully met by the respective audio clip.

The audio clips discriminated into audio classes by the class discrimination means 4 are supplied to segmenting means 11 together with the respective class probability values.

Since the segmenting means 11 is a central element of the present invention its function will be described separately in a subsequent paragraph.

A programme database 5 comprising programme data units is connected to the segmenting means 11.

The programme data units (are adapted to) identify a certain kind of programme of the audio data.

A programme indicates the general subject matter included in the audio data which are not yet divided into audio clips by the audio data clipping means 3.

Said programme might be e.g. movie or sports if the origin for the audio data is a tv-programme.

Self-contained activities comprised in the audio data of each programme are called contents.

The length of time of the contents comprised in the audio data of each programme usually differs. Thus, each contents comprises a certain number of consecutive audio clips.

If the programme is news for example, the contents are the different notices mentioned in the news. If the programme is football, for example, said contents are kick-off, penalty kick, throw-in etc.

In the present embodiment programme data units for each sports, news, commercial, movie and reportage are stored in the programme database 5.

A plurality of respective audio meta patterns is allocated to each programme data unit.

Each audio meta pattern is characterised by a sequence of audio classes of consecutive audio clips.

Audio meta pattern which are allocated to different programme data units can be characterised by the identical sequence of audio classes of consecutive audio clips.

In this context it has to be emphasised that the programme data units preferably should not comprise plural audio meta patterns which are characterised by the same sequence of audio classes of consecutive audio clips. At least, the programme data units should not comprise to many audio meta patterns which are characterised by the same sequence of audio classes of consecutive audio clips.

Furthermore, an audio class probability database 6 is connected to the segmenting means 11.

Probability values for each audio class with respect to a certain number of preceding audio classes for a sequence of consecutive audio clips are stored in the audio class probability database 6.

The function of the audio class probability database 6 is now explained by an example:

If the preceding sequence of audio classes is “speech”, “silence”, “speech” the probability for the audio classes “speech” and “silence” is higher than the probability for the audio classes “music” or “cheering/clapping”.

In the present example, the probability values which are generated by empiric analysis of manually classified audio data are stored in the audio class probability database 6.

Moreover, an audio meta pattern probability database 7 is connected to the segmenting means 11.

Probability values for each audio meta pattern with respect to a certain number of preceding audio meta patterns for a sequence of consecutive audio classes are stored in the audio meta pattern probability database 7.

The function of the audio meta pattern probability database 7 will become more apparent by the following example:

If the programme is football and the preceding audio meta pattern belongs to the content “foul”, the probability for the audio meta patterns belonging to the contents “free kick” or “red card” is higher than the probability for the audio meta pattern belonging to the content “kick off”.

Said probability values are generated by empiric analysis of manually classified audio data.

Furthermore, a programme detection means 8 is connected to both the audio data input means 2 and the segmenting means 1.

The programme detection means 8 identifies the kind of programme the audio data actually belongs to by using previously segmented audio data which are stored in a conventional storage means (not shown).

Said conventional storage means might be a hard disc or a memory, for example.

According to the present embodiment, the functionality of the programme detection means 8 bases on the fact that the kinds of audio data (and thus the audio classes) which are important for a certain kind of programme (e.g. tv-show, news, football etc.) differ in dependency on the programme the observed audio data belongs to.

If the kind of programme is “football” for example, the audio class “cheering/clapping” is an important audio class. In contrast, if the kind of programme is “rock concert” for example, the audio class “music” is the most important audio class.

Thus, by detecting the frequency of occurrence of audio classes the general contents of the observed audio data and thus the kind of programme can be identified.

Finally, output file generation means 9 comprising a data output port 13 is connected to the segmentation means 11.

The output file generation means 9 generates an output file containing both the audio data supplied to the audio data input means and data relating to the begin time, the end time and the contents of the audio data allocated to a respective meta pattern.

Furthermore, the output file generation means 9 outputs the output file via the data output port 13.

The data output port 13 can be connected to a recording apparatus (not shown) which stores the output file to a recording medium.

The recording apparatus might be a DVD-writer, for example.

In the following, the function of the segmenting means 11 is explained in detail with reference to FIG. 2.

The segmenting means 11 segments the audio data provided by the class discrimination means 4 into audio meta patterns based on a sequence of audio classes of consecutive audio clips.

As said before, the contents comprised in the audio data are composed of a sequence of consecutive audio clips, each. Since each audio clip can be discriminated into an audio class each content is composed of a sequence of corresponding audio classes of consecutive the audio clips, too.

Therefore, by comparing the sequence of audio classes of consecutive audio clips which belong to the contents of the respective audio data with the sequence of audio classes of consecutive audio clips which belong to the audio meta patterns it is possible to find audio meta patterns which might (be adapted to) identify the respective content.

As mentioned above, each audio meta pattern is allocated to a predetermined programme data unit and stored in the programme database 5. Thus, each audio meta pattern is allocated to a certain programme, too.

If the programme is e.g. “football” there are for example provided audio meta patterns for identifying “penalty kick”, “goal”, “throw in” and “foul”. If the program is e.g. “news”, there are audio meta patterns for “politics”, “disasters”, “economy” and “weather”.

Although a large number of audio meta patterns might be found by comparing the sequence of audio classes which belongs to the contents with the sequence of audio classes which belongs to the audio meta patterns, the correspondingly found audio meta patterns usually will belong to different programme data units.

The present invention bases on the fact that audio data of different programmes normally comprise different contents, too. Thus, once the actual programme and the corresponding programme data unit is identified it is more likely that even the further audio meta patterns belong to said programme data unit.

Therefore, by identifying the kind of programme the audio data actually belongs to, the number of possible audio meta patterns which might (be adapted to) identify the respective content can be reduced to the audio meta patterns which belong to the programme data unit corresponding to the respective programme.

Thus, allocation of meta patterns to respective sequences of audio classes is significantly facilitated by use of the programme database 5.

The actual programme might be identified by the segmenting means 11 by determining (counting) to which programme data unit most of the already segmented audio meta patterns belong to, for example.

Alternatively, the output value of the programme detection means 8 can be used.

The segmenting of audio data on the basis of the programme database is further explained by the following example:

An audio meta pattern for "foul" is allocated to a programme data unit "football" which is stored in the programme database. Furthermore, an audio meta pattern for "disasters" is allocated to a programme data unit "news" which is stored in the programme database, too.

The sequence of audio classes of consecutive audio clips characterising the audio meta pattern "foul" might be identical to the sequence of audio classes of consecutive audio clips characterising the audio meta pattern "disasters".

Once it is decided that the audio data belongs to the programme "football", the audio meta pattern "foul" which is stored in the programme data unit "football" is more likely correct than the audio meta pattern "disaster" which is stored in the programme data unit "news".

Thus, in the present example the segmenting means 11 segments the respective audio clips to the audio meta pattern "foul".

Moreover, the segmenting means 11 uses probability values for each audio class which are stored in the audio class probability database 6 for segmenting the audio data into audio meta patterns.

By using probability values for each audio class it is possible to identify the significance of each audio class with respect to a certain number of preceding audio classes and to account for said significance during segmentation of audio data into audio meta patterns.

Furthermore, the segmenting means 11 uses probability values for each audio meta pattern which are stored in the audio meta pattern probability database 7 for segmenting the audio data into audio meta patterns.

As said before, plural audio meta patterns might be characterised by the same sequence of audio classes of consecutive audio clips. In case said audio meta patterns belong to the same programme data unit no unequivocal decision can be made by the segmenting means 11 based on the programme database 5, only.

By using probability values for each audio meta pattern the segmenting means 11 identifies a certain audio meta pattern out of the plurality of audio meta patterns which most probably is suitable to identify the type of contents of the audio data with respect to the preceding audio meta patterns.

Thus, no further rules have to be provided to deal with problems where more then one audio meta pattern of a programme data unit is characterised by the same sequence of audio classes of consecutive audio clips.

Moreover, the segmenting means 11 uses class probability values calculated by the class discrimination means 4 for segmenting the audio data into audio meta patterns.

Said class probability values are supplied to the segmenting means 11 by the class discrimination means 4 together with the respective audio classes.

As said before, the respective class probability value indicates the likeliness whether the correct audio class has been chosen for a respective audio clip.

In summary, according to the present embodiment the segmenting means 11 uses as well the programme database 5 as the audio class probability database 6 as the audio meta pattern probability database 7 as the class probability values calculated by the class discrimination means 4 for segmenting the audio data into corresponding audio meta patterns.

This is performed by the segmenting means 11 by calculating probability values for each audio meta pattern for each sequence of audio classes of consecutive audio clips by using a Viterbi algorithm.

Alternatively, only the programme database 5 or the programme database 5 and either the audio class probability database 6 or the audio meta pattern probability database 7 might be used for segmenting the audio data into corresponding audio meta patterns. The class probability values calculated by the class discrimination means 4 might be used additionally, too.

In the present example the segmenting means 11 is further adapted to limit segmentation of the audio data into audio meta patterns to the audio meta patterns allocated to the programme data unit of the kind of programme identified by the programme detection means 8.

Thus, the accuracy of the inventive audio data segmentation apparatus 1 can be enhanced and to the complexity of calculation can be reduced.

Summarising, the audio data segmenting apparatus 1 according to the present invention is capable of segmenting audio data into corresponding audio meta patterns by defining a number of audio meta patterns which are most probably suitable for a concrete programme.

Therefore, the allocation of meta patterns to respective sequences of audio classes is significantly facilitated.

By using up to three probability values (probability values for each audio class, probability values for each audio meta pattern, class probability values) and the data stored in the programme database the segmentation of the audio data is very reliable.

Furthermore, errors in either of the components of the inventive audio segmentation apparatus do not necessarily lead to an error in the final segmentation since the joint maximum probability of all knowledge sources is used to ensure optimality in segmentation.

According to the present invention, the class discrimination means, the audio class probability database and the audio meta pattern probability database exploit the statistical characteristics of the corresponding programme and hence give better performance than the prior art solutions.

Figure 2:
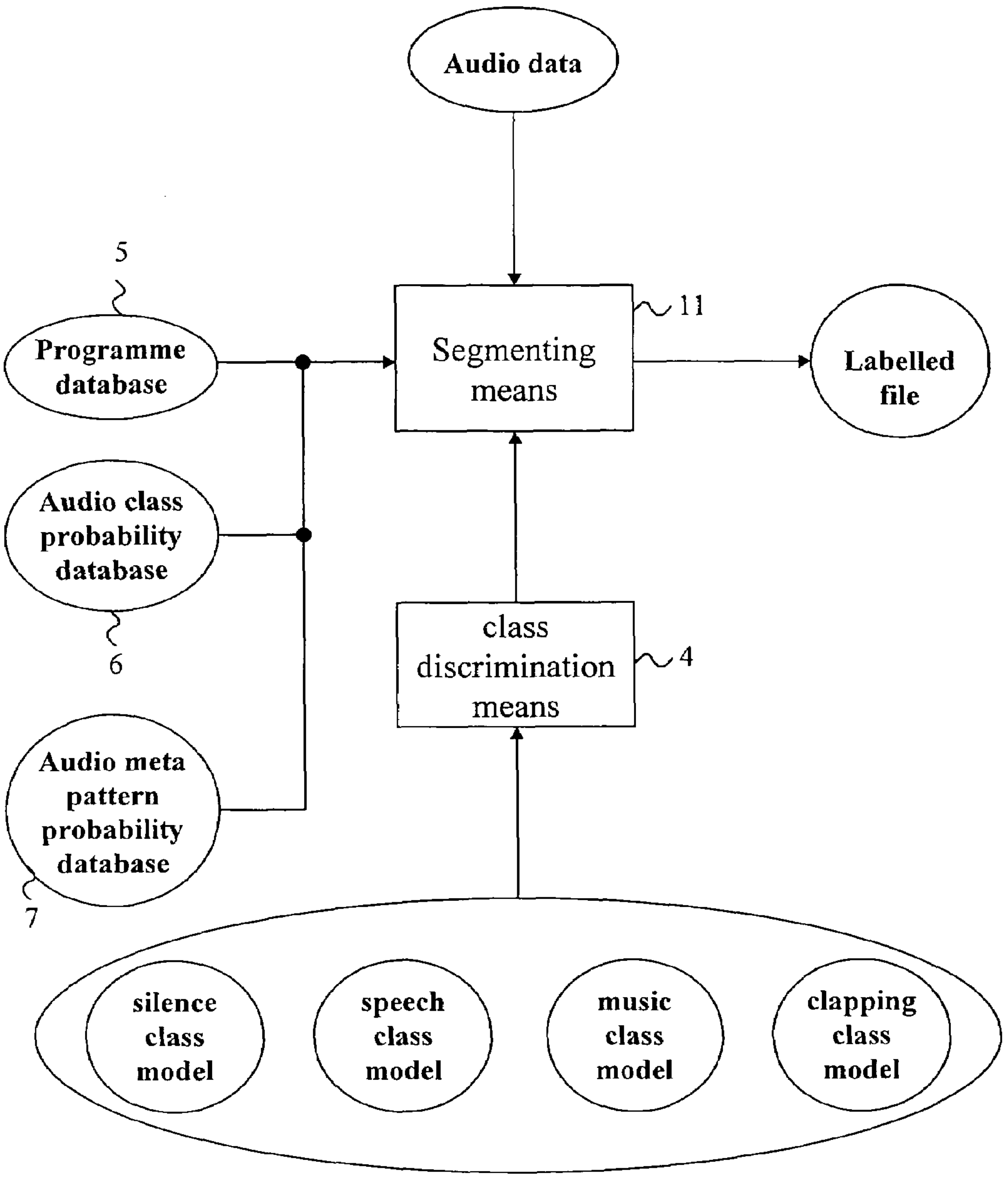
FIG. 2 shows the function of the method for segmenting audio data according to the present invention based on a schematic diagram.

To enhance clarity of the FIGS. 1 and 2 supplementary means as power supply, buffer memories etc. are not shown.

In the embodiment shown in FIG. 1 separated microprocessors are used for the audio data clipping means 3, the class discrimination means 4 and the segmenting means 11.

Alternatively, one single microcomputer might be used to incorporate the audio data clipping means, the class discrimination means and the segmenting means.

Furthermore, FIG. 1 shows separated memories for the programme database 5, the audio class probability database 6 and the audio meta pattern probability database 7.

Alternatively, even one common memory means (e.g. a hard disc) might be used to incorporate plural or all of these databases.

Alternatively, even one common memory means (e.g. a hard disc) might be used to incorporate plural or all of these databases.

Thus, the inventive audio data segmentation apparatus might be realised by use of a personal computer or workstation.

According to a further embodiment of the present invention which is not shown in detail, the audio data segmentation apparatus does not comprise a programme database.

Thus, segmentation of the audio data into audio meta patterns based on a sequence of audio classes of consecutive audio clips is performed by the segmenting means on the basis of the probability values stored in the audio class probability database and/or audio meta pattern probability database, only.

As is evident from the foregoing description and drawings, the present invention provides substantial improvements in the allocation of meta patterns to respective sequences of audio classes in a system and a method for the segmentation of audio data into meta patterns. It will also be apparent that various details of the illustrated examples of the present invention, shown in there preferred embodiments, may be modified without departing from the inventive concept and the scope of the appended claims.

The invention claimed is:

1. A method for segmenting audio data comprising:

dividing, using a computer, audio data into audio clips of a predetermined length;

audio data input means for supplying audio data;

audio data clipping means for dividing the audio data supplied by the audio data input means into audio clips of a predetermined length;

class discrimination means for discriminating the audio clips supplied by the audio data clipping means into predetermined audio classes, the audio classes identifying a kind of audio data included in the respective audio clip; and segmenting means for segmenting the audio data into audio meta patterns based on a sequence of audio classes of consecutive audio clips, each meta pattern being allocated to a predetermined type of contents of the audio data, wherein the audio data segmentation apparatus further comprises:

a program database comprising program data units to identify a certain kind of program, a plurality of respective audio meta patterns being allocated to each program data unit;

an audio class probability database comprising probability values for each audio class with respect to a certain number of preceding audio classes for a sequence of consecutive audio clips; and an audio meta pattern probability database comprising probability values for each audio meta pattern with respect to a certain number of preceding audio meta patterns for a sequence of audio classes, wherein the segmenting means segments the audio data into corresponding audio meta patterns on the basis of the program data units of the program database, using the audio class probability database and the audio meta pattern probability database.

2. The audio data segmentation apparatus according to claim 1, wherein the segmenting means segments the audio data into audio meta patterns by calculating probability values for each audio meta pattern for each sequence of audio classes of consecutive audio clips based on the program database and/or the audio class probability database and/or the audio meta pattern probability database.

3. The audio data segmentation apparatus according to claim 1, wherein the audio data segmentation apparatus further comprises:

program detection means for identifying the kind of program the audio data belongs to by using previously segmented audio data, wherein the segmenting means is further adapted to limit segmentation of the audio data into audio meta patterns to the audio meta patterns allocated to the program data unit of the kind of program identified by the program detection means.

4. The audio data segmentation apparatus according to claim 1, wherein the class discrimination means is further adapted to calculate a class probability value for each audio class of each audio clip, wherein the segmenting means is further adapted to use the class probability values calculated by the class discrimination means for segmenting the audio data into corresponding audio meta patterns.

5. The audio data segmentation apparatus according to claim 1, wherein the segmenting means includes a Viterbi algorithm to segment the audio data into audio meta patterns.

6. The audio data segmentation apparatus according to claim 1, wherein the class discrimination means uses a set of predetermined audio class models which are provided for each audio class for discriminating the clips into predetermined audio classes.

7. The audio data segmentation apparatus according to claim 6, wherein the predetermined audio class models are generated by empiric analysis of manually classified audio data.

8. The audio data segmentation apparatus according to claim 6, wherein the audio class models are provided as hidden Markov models.

9. The audio data segmentation apparatus according to claim 1, wherein the class discrimination means analyses acoustic characteristics of the audio data comprised in the audio clips to discriminate the audio clips into the respective audio classes.

10. The audio data segmentation apparatus according to claim 9, wherein the acoustic characteristics comprise energy/loudness, pitch period, bandwidth and mfcc of the respective audio data.

11. The audio data segmentation apparatus according to claim 1, wherein the audio data input means are further adapted to digitize the audio data.

12. The audio data segmentation apparatus according to claim 1, wherein each audio clip generated by the audio data clipping means contains a plurality of overlapping short intervals of audio data.

13. The audio data segmentation apparatus according to claim 1, wherein the predetermined audio classes comprise a class for at least each silence, speech, music, cheering and clapping.

14. The audio data segmentation apparatus according to claim 1, wherein the program database comprises program data units for at least each sports, news, commercial, movie and reportage.

15. The audio data segmentation apparatus according to claim 1, wherein probability values for each audio class are generated by empiric analysis of manually classified audio data.

16. The audio data segmentation apparatus according to claim 1, wherein probability values for each audio meta pattern are generated by empiric analysis of manually classified audio data.

17. The audio data segmentation apparatus according to claim 1, wherein the audio data segmentation apparatus further comprises an output file generation means to generate an output file, wherein the output file contains the begin time, the end time and the contents of the audio data allocated to a respective meta pattern.

18. The audio data segmentation apparatus according to claim 1, wherein the audio data is part of raw data containing both audio data and video data.

19. A computer-readable storage medium encoded with computer program instructions which when executed by a computer causes the computer to implement a method for segmenting audio data comprising:

dividing audio data into audio clips of a predetermined length;

discriminating the audio clips into predetermined audio classes, the audio classes identifying a kind of audio data included in the respective audio clip; and segmenting the audio data into audio meta patterns based on a sequence of audio classes of consecutive audio clips, each meta pattern being allocated to a predetermined type of contents of the audio data, wherein the segmenting the audio data into audio meta patterns further comprises the use of a program database comprising program data units to identify a certain kind of program, wherein the segmenting the audio data into audio meta patterns further comprises the use of an audio class probability database comprising probability values for each audio class with respect to a certain number of preceding audio classes for a sequence of consecutive audio clips, wherein the segmenting the audio data into audio meta patterns further comprises the use of an audio meta pattern probability database comprising probability values for each audio meta pattern with respect to a certain number of preceding audio meta patterns for a sequence of audio classes, and wherein a plurality of respective audio meta patterns is allocated to each program data unit and the segmenting is performed on the basis of the program data units.

20. The method for segmenting audio data according to claim 19, wherein the segmenting the audio data into audio meta patterns comprises calculation of probability values for each meta data for each sequence of audio classes of consecutive audio clips based on the program database and/or the audio class probability database and/or the audio meta pattern probability database.

21. The method for segmenting audio data according to claim 19, wherein the method for segmenting audio data further comprises identifying the kind of program the audio data belongs to by using the previously segmented audio data, wherein the segmenting the audio data into audio meta patterns comprises limiting segmentation of the audio data into audio meta patterns to the audio meta patterns allocated to the program data unit of the identified program.

22. The method for segmenting audio data according to claim 19, wherein the discriminating the audio clips into predetermined audio classes comprises calculation of a class probability value for each audio class of each audio clip, wherein the segmenting the audio data into audio meta patterns further comprises the use of the class probability values calculated by the class discrimination means for segmenting the audio data into corresponding audio meta patterns.

23. The method for segmenting audio data according to claim 19, wherein the segmenting the audio data into audio meta patterns comprises the use of a Viterbi algorithm to segment the audio data into audio meta patterns.

24. The method for segmenting audio data according to claim 19, wherein the discriminating the audio clips into predetermined audio classes comprises the use of a set of predetermined audio class models which are provided for each audio class for discriminating the clips into predetermined audio classes.

25. The method for segmenting audio data according to claim 24, wherein the method for segmenting audio data further comprises generating the predetermined audio class models by empiric analysis of manually classified audio data.

26. The method for segmenting audio data according to claim 19, wherein hidden Markov models are used to represent the audio classes.

27. The method for segmenting audio data according to claim 19, wherein the step of discriminating the audio clips into predetermined audio classes comprises analysis of acoustic characteristics of the audio data comprised in the audio clips.

28. The method for segmenting audio data according to claim 27, wherein the acoustic characteristics comprise energy/loudness, pitch period, bandwidth and mfcc of the respective audio data.

29. The method for segmenting audio data according to claim 19, wherein the method for segmenting audio data further comprises digitizing audio data.

30. The method for segmenting audio data according to claim 19, wherein the method for segmenting audio data further comprises empiric analysis of manually classified audio data to generate probability values for each audio class and/or for each audio meta pattern.

31. The method for segmenting audio data according to claim 19, wherein the method for segmenting audio data further comprises generating an output file, wherein the output file contains the begin time, the end time and the contents of the audio data allocated to a respective meta pattern.

32. An audio data segmentation apparatus for segmenting audio data comprising:

an audio data input device configured to supply audio data;

an audio data clipping device configured to supply the audio data supplied by the audio data input device into audio clips of a predetermined length;

a class discrimination device configured to discriminate the audio clips supplied by the audio data clipping device into predetermined audio classes, the audio classes identifying a kind of audio data included in the respective audio clip; and a segmenting device configured to segment the audio data into audio meta patterns based on a sequence of audio classes of consecutive audio clips, each meta pattern being allocated to a predetermined type of contents of the audio data, wherein the audio data segmentation apparatus further comprises:

a program database comprising program data units configured to identify a certain kind of program, a plurality of respective audio meta patterns being allocated to each program data unit;

an audio class probability database comprising probability values for each audio class with respect to a certain number of preceding audio classes for a sequence of consecutive audio clips; and an audio meta pattern probability database comprising probability values for each audio meta pattern with respect to a certain number of preceding audio meta patterns for a sequence of audio classes, wherein the segmenting device segments the audio data into corresponding audio meta patterns on the basis of the program data units of the program database, using the audio class probability database and the audio meta pattern probability database.

* * * * *